(12) United States Patent
Jeney

(10) Patent No.: US 10,836,969 B2
(45) Date of Patent: Nov. 17, 2020

(54) PROCESS REACTING ORGANIC MATERIALS TO GIVE HYDROGEN GAS

(71) Applicant: CLEANCARBONCONVERSION PATENTS AG, Pfaeffikon (CH)

(72) Inventor: Peter Jeney, Zug (CH)

(73) Assignee: CLEANCARBONCONVERSION PATENTS AG, Pfaeffikon (CH)

( * ) Notice: Subject to any disclaimer, the term of this patent is extended or adjusted under 35 U.S.C. 154(b) by 116 days.

(21) Appl. No.: 15/920,030

(22) Filed: Mar. 13, 2018

(65) Prior Publication Data

US 2018/0201850 A1 Jul. 19, 2018

Related U.S. Application Data

(62) Division of application No. 15/129,451, filed on Sep. 27, 2016, now Pat. No. 9,920,269.

(51) Int. Cl.
| | |
|---|---|
| *C10J 3/72* | (2006.01) |
| *C01B 3/02* | (2006.01) |
| *C10K 1/00* | (2006.01) |
| *F16L 51/02* | (2006.01) |
| *C01B 3/34* | (2006.01) |

(52) U.S. Cl.
CPC ............... *C10J 3/723* (2013.01); *C01B 3/02* (2013.01); *C01B 3/34* (2013.01); *C10J 3/721* (2013.01); *C10K 1/002* (2013.01); *C10K 1/007* (2013.01); *F16L 51/022* (2013.01); *C01B 2203/0216* (2013.01); *C01B 2203/0405* (2013.01); *C01B 2203/0415* (2013.01); *C01B 2203/146* (2013.01); *C10J 2200/09* (2013.01); *C10J 2300/0916* (2013.01); *C10J 2300/0946* (2013.01); *C10J 2300/0973* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,748,815 | A * | 2/1930 | Wisner | C10B 1/10 202/218 |
| 3,838,849 | A * | 10/1974 | Alexander | C21C 5/50 266/135 |
| 4,277,316 | A * | 7/1981 | Taylor | B01D 3/08 196/112 |
| 4,764,318 | A * | 8/1988 | Morgenstern | C10B 55/00 264/29.5 |
| 2009/0183430 | A1* | 7/2009 | Schubert | C10J 3/04 48/85 |
| 2012/0161451 | A1* | 6/2012 | Struble | C01B 3/32 290/1 R |
| 2016/0264872 | A1* | 9/2016 | Endou | F27B 7/42 |

* cited by examiner

*Primary Examiner* — Kaity V Chandler
(74) *Attorney, Agent, or Firm* — Dority & Manning, P.A.

(57) ABSTRACT

A method of recovering a hydrogen-enriched gas at least 70 percent by volume hydrogen includes introducing into the feed device to a rotary furnace defining a tubular interior space, starting materials containing carbon or hydrocarbons. A mass of water being added to the starting material is regulated according to the content of hydrogen in the gas mixture leaving the rotary furnace. The tubular interior space of the rotary furnace is expanded axially to accommodate thermally expanding the starting material and water in the interior space of the rotary furnace.

9 Claims, 5 Drawing Sheets

PROCESS REACTING ORGANIC MATERIALS TO GIVE HYDROGEN GAS

CROSS-REFERENCE TO RELATED APPLICATIONS

The present application is a divisional of application Ser. No. 15/129,451, filed Sep. 27, 2017, which is hereby incorporated hereby by this reference for all purposes. International Application Serial No. PCT/EP2015/050767 is hereby incorporated herein in its entirety for all purposes by this reference.

FIELD OF THE INVENTION

The invention relates to high-temperature furnaces which are heated by means of a heating system and to a process of using such furnaces in order to convert organic materials into a synthetic gas with a high concentration of hydrogen. In particular rotary furnaces are involved which are suitable for the processing of starting materials containing carbon or hydrocarbon, such as waste materials, residual materials, biomasses and similar.

BACKGROUND

There are various furnaces which are heated with induction coils for example. One example is known from the international patent application with publication number WO09010086A1, which is also published as US patent application publication no. 2010-181538, which is hereby incorporated herein by this reference for all purposes. A further example is set out in European patent EP 1495276 B1, which is also published as US patent application publication no. 2005-185692, which is hereby incorporated herein by this reference for all purposes.

It has been found that problems with the reliability of such induction furnaces can occur if very high temperatures are present over a longer period of time or if very aggressive materials are released in the furnace. For example, oxygen released from the material to be converted can attack the furnace wall. There are therefore attempts to prevent oxygen reaching the interior of the furnace in the first place. An example of this is known from the international patent application with the publication number WO09010100A1, which is also published as US patent application publication no. 2010-242814, which is hereby incorporated herein by this reference for all purposes. However, even more aggressive are substances containing sulphur and chlorine. Sulphur and chlorine are common constituents of organic materials, e.g. in the case residues or similar.

BRIEF SUMMARY OF THE INVENTION

In the present invention it is therefore a matter of providing furnaces which offer improved stability to aggressive materials even at high temperatures. It is also about methods of efficient conversion of starting materials containing carbon into a synthetic gas containing a high proportion of hydrogen gas.

A device according to the invention which is designed for reacting an organic starting material to give gas which comprises a portion of hydrogen gas, comprises
   a feed device,
   a rotary furnace (also referred to hereinafter as a tubular furnace) with an entry zone, an inner space, an axis of rotation and with an exit side, and
   a water feed which is arranged in the region of the feed device or entry zone in order to be able to add water to the starting material.

The feed device and the rotary furnace are designed and configured so that in the region of the entry zone the starting material can be fed into the inner space of the tubular furnace and that a solid material as well as a gas mixture can be discharged at the exit side of the tubular furnace. The device is characterised in that the tubular furnace comprises a first zone and a second zone, wherein
   the first zone is in a region between the entry zone and the second zone,
   the second zone is in a region between the first zone and the exit side.

The device is characterised in that it comprises a compensator which is preferably arranged in a transition area between the first zone and the second zone.

In all forms of embodiment the compensator serves to compensate different thermally-induced expansions of the first zone and the second zone of the tubular furnace.

The device is characterized in that
   a gas-conducting system is arranged on the exit side of the tubular furnace and is designed to conduct the gas onwards,
   a gas monitor is arranged in the region of the gas-conducting system, wherein the gas monitor is designed to monitor the content of hydrogen gas in the gas mixture,
wherein the water feed can be regulated as a function of the content of hydrogen gas in the gas mixture.

This type of device permits efficient reacting of a starting material to produce a gas mixture that has a high, preferably more than 80%, content of hydrogen gas (known as hydrogen-enriched gas).

According to the invention the hydrogen-enriched gas is produced from slightly moist to moist organic educts in solid form, i.e. from organic solids. If required, fluid components can also be added/mixed to the organic solids at the entry side.

As selecting the starting materials (educts) is not possible, or if so only to a limited extent, in accordance with the invention the composition of the synthesis is regulated through the addition or more or less water, depending on the required hydrogen content in the synthesis gas at the exit side of the furnace.

Following these process stages of the invention which take place in the two successively arranged zones of the furnace, the remaining synthesis gas contains up to 70 percent by volume hydrogen. Preferably the remaining synthesis gas comprises up to 80 percent by volume hydrogen.

The hydrogen-enriched gas can be discharged at the exit side of the invented device and be used as fuel for example.

The conversion of the starting products (educts) in the furnace is at least partially exothermic. In order to provide suitable processing conditions in the two zones of the furnace, the furnace is provided with a heating system. Preferably in all forms of embodiment the heating system is applied externally on the tubular furnace and can operate inductively, and/or it can be a resistance heating system.

The tubular furnace of the device is designed in two parts, wherein a first zone is separated from a second zone by a compensator.

The (organic) starting material can be fed into the interior space of the tubular furnace through a feed device in the region of the entry zone. In all forms of embodiment the tubular furnace is preferably designed as a rotationally symmetrical tubular furnace in the internal space of which conveying elements are arranged in order, during a rotational movement of the tubular furnace, to convey the starting material in the direction of the exit side of the tubular furnace.

The high-temperature device comprises a (resistance or induction) heating system which is arranged in the region of the circumference of the tubular furnace and which in the tubular furnace defines at last one hot zone (second zone) and a less hot zone (first zone). Seen from the entry side the hot zone follows the less hot zone.

According to the invention the heating system is designed so that a temperature in the interior space of the tubular furnace in the region of the hot zone can be achieved which is above 1000 degrees Celsius and is preferably in the range between 1100 degrees Celsius and 1300 degrees Celsius.

According to the invention the heating system is designed so that a temperature in the interior space of the tubular furnace in the region of the less hot zone can be achieved which is between 300 degrees Celsius and 900 degrees Celsius wherein this temperature is preferably between 600 degrees Celsius and 850 degrees Celsius.

The process according to the invention is characterised in that a conversion of organic starting material into a gaseous product takes place in the device. This conversion takes place in stages in the interior space of the tubular furnace of the device. At the entry side/zone the starting material is fed into the interior space. The tubular furnace is turned about an axis of rotation in order to convey the starting material in the interior space from the entry side to the exit side. According to the invention, while being conveyed through the interior space and during the reaction the starting material passes through a first temperature zone with an operating temperature of between 300 degrees Celsius and 900 degrees Celsius (preferably between 600 degrees Celsius and 850 degrees Celsius), followed by a second temperature zone with an operating temperature above 1000° C. (preferably between 1100 degrees Celsius and 1300 degrees Celsius).

The invention relates in particular to devices which are heated by means of a (two-part) resistance heating system and to processes utilizing such devices in order to react starting materials in order to produce hydrogen gas. Involved, in particular, are tubular furnaces which are suitable for processing starting materials containing carbon and hydrocarbons, such as waste materials, residual substances, biomasses and similar materials.

BRIEF DESCRIPTION OF THE DRAWINGS

The invention will be explained below with the aid of examples of embodiment with reference to a drawing. In this.

Locations and directions are used in the following in order to be able to better describe the invention. These details are related to the relevant installation situation and should not therefore be understood as being restrictive.

DESCRIPTION OF EXEMPLARY EMBODIMENTS OF THE INVENTION

Figure 1:
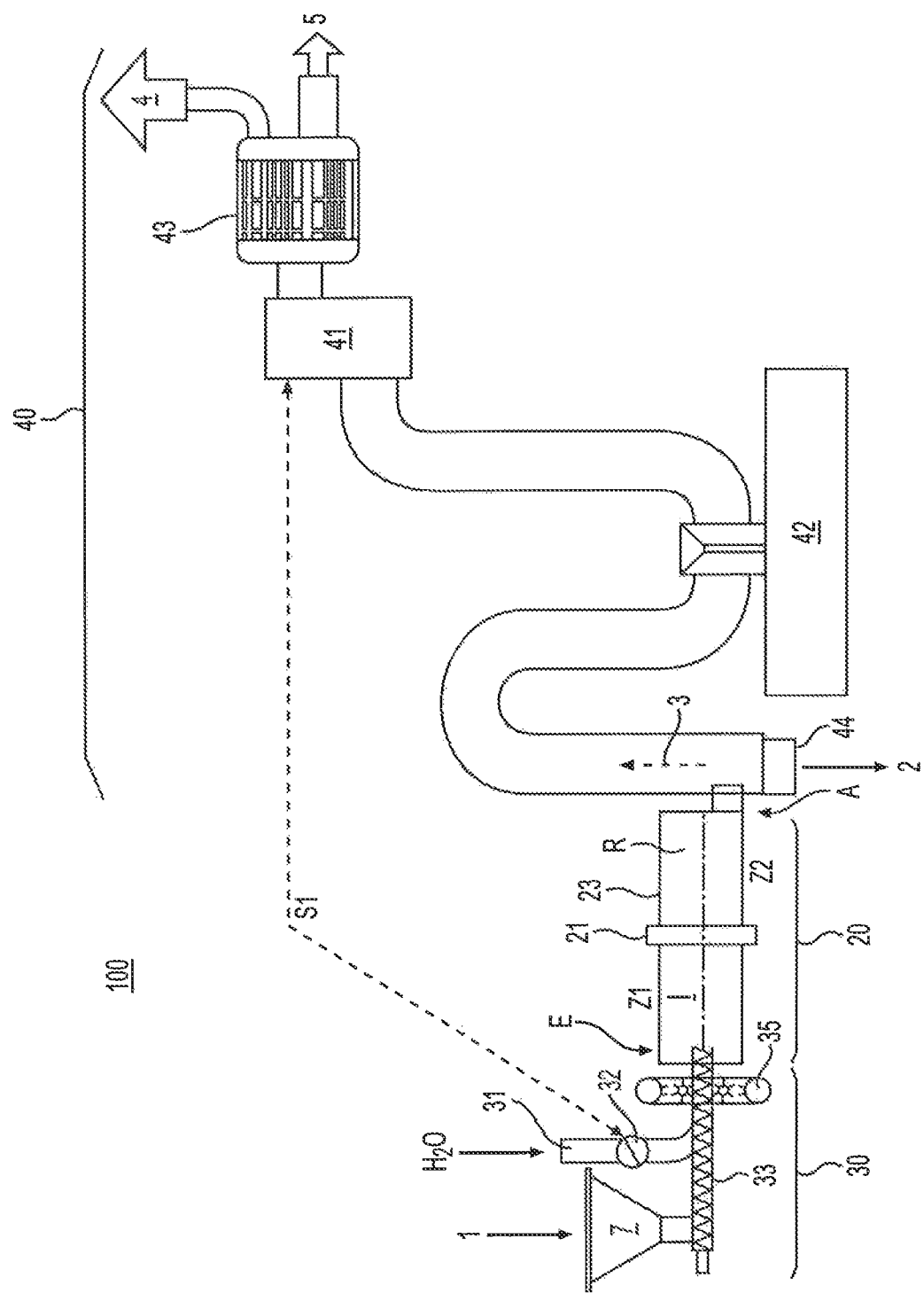
FIG. 1 shows a schematic side view of a preferred form of embodiment of a device according to the invention.

The invention concerns the processing, or reacting of organic starting materials which are schematically designated in FIG. 1 by the numeral 1, i.e. starting material containing carbon or hydrocarbons, such as waste materials, residual substances, biomasses and similar. During this processing, or reaction, at least one gas mixture 3 and one solid material 2 are formed. Preferably produced as the gas mixture is synthesis gas containing carbon monoxide MO and hydrogen $H_2$. Depending on the processing the synthesis gas contains a high content of hydrogen gas 4. Preferably the content of hydrogen gas is more than 80%.

The gas mixture 3 can also contain smaller portions of $CO_2$ and unconverted methane ($CH_4$).

According to the invention, depending on the starting material and the operating conditions the $H_2/CO$ ratio is above 4 and particularly preferably above 5. An important aspect is that the invention requires no $CO_2$ to be returned in order to produce a high hydrogen content.

Details of the invention will be explained below with the aid of a preferred form of embodiment and with reference to FIG. 1. Further forms of embodiment are derived from this preferred formed of embodiment.

The high-temperature device 100 according to the invention is specially designed to convert an organic starting material 1. As schematically shown in FIG. 1, the device 100 comprises a feed device 30 and a rotationally symmetrical rotary furnace 20 with an axis of rotation R. The axis of rotation R is typically arranged horizontally or slightly sloped. In a sloping arrangement the angle of inclination can be up to 45 degrees. In a sloping arrangement at least the rotary furnace 20 is inclined, wherein the exit side A is higher than the entry zone E. Preferred, however, is the horizontal alignment of the axis of rotation R as shown in FIG. 1.

For reacting organic starting materials 1 to produce hydrogen gas 4 a water or steam feed 31 is arranged in the region of the entry zone E. This feed 31 is preferably located outside the tubular furnace 20 before the entry zone E as indicated in FIG. 1.

Through regulation of the water or steam feed 31, the starting material 1 is fed into the interior space I of the tubular furnace in moist form.

The form of embodiment according to FIG. 1 comprises a regulator or regulating circuit which on the exit side comprises a gas monitor 41 in the region of a gas-conducting system 40. The gas monitor 41 can include a gas manometer and directly or indirectly (e.g. via an intermediate computer) allows an adjusting signal S1 to be delivered to the water feed 31. With this adjusting signal S1, also known as a control variable, the quantity of water or steam supplied can be regulated, for example, by means of a valve, a pump or a flap (here schematically designated in FIG. 1 as an actuator 32).

As the gas monitor 41, in all forms of embodiment a gas monitor 41 can be used, for example, which comprises an electrochemical hydrogen sensor or an electrochemical hydrogen measuring cells.

In all forms of embodiment the gas monitor 41 can, for example, deliver a measuring signal that provides information about the hydrogen content in the gas mixture 3. This measuring signal can be used directly or indirectly, e.g. via a computer, to provide a control variable S1, which via an actuator 32 influences of the quantity of added water.

On the one hand in order to make possible an efficient reaction of the starting material 1 to produce a gas mixture 3 with a high hydrogen gas content 4, a sufficient quantity of water must be added on the entry side. On the other hand a two-stage reaction must take place in which the starting material 1 passes through a first zone Z1 with a less hot temperature T1 and then a second zone Z2 with a hotter temperature T2.

T2>>T1 applies. Preferably T1 is between 300 degrees Celsius and 900 degrees Celsius. Particularly preferably T1 is between 600 degrees Celsius and 850 degrees Celsius. Preferably T2 is above 1000° C. Particularly preferably T2 is between 1100 degrees Celsius and 1300 degrees Celsius.

Studies and test runs have shown that during the two-stage temperature treatment, in the cited temperature ranges aggressive components are produced from the moistened starting material 1 which attack the material of the tubular furnace 20. Therefore, according to the invention special materials have to be used, with the material of the first zone Z1 differing from the material of the second zone Z2.

According to the invention each of the zones Z1 and Z2 must be separately optimised in order to obtain a tubular furnace 20 which can be durably utilised without suffering greater damage.

Preferably in all forms of embodiment, in the first zone Z1 the tubular furnace 20 comprises a temperature-resistant metal or a temperature-resistant alloy, wherein a nickel alloy is preferably used.

For the purposes of this document a nickel alloy is an alloy which by percentage weight comprises more nickel than other metal elements. Preferably nickel alloys are used which are resistant to corrosion and oxidation in a temperature range up to 900 degrees Celsius. For use as a material in the region of the first zone Z1 of the tubular furnace 20 resistance to aggressive gas components is also important. Above all the material must be resistant to halogen ions and/or hydrogen sulphide.

In addition to nickel as the main component, in all forms of embodiment chromium is also an important secondary component of the material of the first zone Z1. Additionally, one or more of the following elements can be included in the nickel alloy: iron, molybdenum, niobium, cobalt, manganese, copper, aluminium, titanium, silicon, carbon, sulphur, phosphorus or boron.

Particularly suitable is Inconel® or an Inconel alloy by the company Special Metals Corporation of Huntington, W. Va.

In all forms of embodiment in the region of the second zone Z2 the tubular furnace 20 preferably comprises a material which serves as protection against aggressive gases and the high temperature T2 in the interior space I of the tubular furnace 20.

In the region of the second zone Z2 the tubular furnace 20 preferably comprises
  a temperature-resistant metal with a high temperature-resistant ceramic coating,
  a temperature-resistant metal with high temperature-resistant ceramic reinforcement,
  a temperature-resistant metal with high temperature-resistant ceramic aggregate,
  a high temperature-resistant compound of metal and ceramic, or
  a high temperature-resistant ceramic material,
wherein the ceramic material preferably comprises one of the components of the following group: aluminium oxide ($Al_2O_3$), silicon carbide (SiC), silicon nitride ($Si_3N_4$).

In all forms of embodiment the tubular furnace 20 can be configured either in one piece (e.g. one tube that is differently coated on the inside) or in two pieces (e.g. one longitudinal section of ceramic material and one longitudinal section of temperature-resistant metal).

The cited tubular furnace (20) materials are very different and it has been shown that they cannot be combined with each other in a tubular furnace in a durably resistant manner. The invention therefore uses a compensator 21 which, as shown in FIG. 1 for example, can separate the first zone Z1 from the second zone Z2. However, depending on its design, the compensator 21 can also be arranged at another location.

In all forms of embodiment the compensator 21 of the invention is designed so that it essentially fulfils two tasks. Firstly the compensator 21 serves to bridge or compensate mechanical stresses which can occur between the first zone Z1 and the second zone Z2 (e.g. in a two-piece tubular furnace) of the tubular furnace 20 due to great temperature differences and different coefficients of expansion of the materials used. Secondly, in all forms of embodiment the compensator 21 preferably forms a gas-tight connection between zones Z1 and Z2. In all forms of embodiment the compensator 21 is thus preferably designed to be resistant to high temperatures, flexible and gas-tight.

In all forms of embodiment the compensator 21 preferably comprises
  silicate, e.g. a natural micaceous mineral, preferably phlogopite mica, or a synthetic mica
  an inorganically bound glass/mica combination,
  a graphite material,
wherein in all forms of embodiment the appropriate material has a melting point above 1200 degrees Celsius.

In all forms of embodiment the material cited in the last paragraph is preferably arranged in a region between the material of the first zone Z1 and the material of the second zone Z2.

In all forms of embodiment the compensator 21 preferably comprises a ceramic textile in addition or as an alternative to the silicate, the glass/mica combination or the graphite material.

In all forms of embodiment ceramic textile mats are preferably used as a component of the compensator 21. Particularly preferred are mats with metal oxide fibers. Very particularly preferred at mats by the company 3M of St. Paul Minn. sold under the trade name Nextel™, wherein they should be designed for use at a temperature above 1200 degrees Celsius.

Figure 4A:
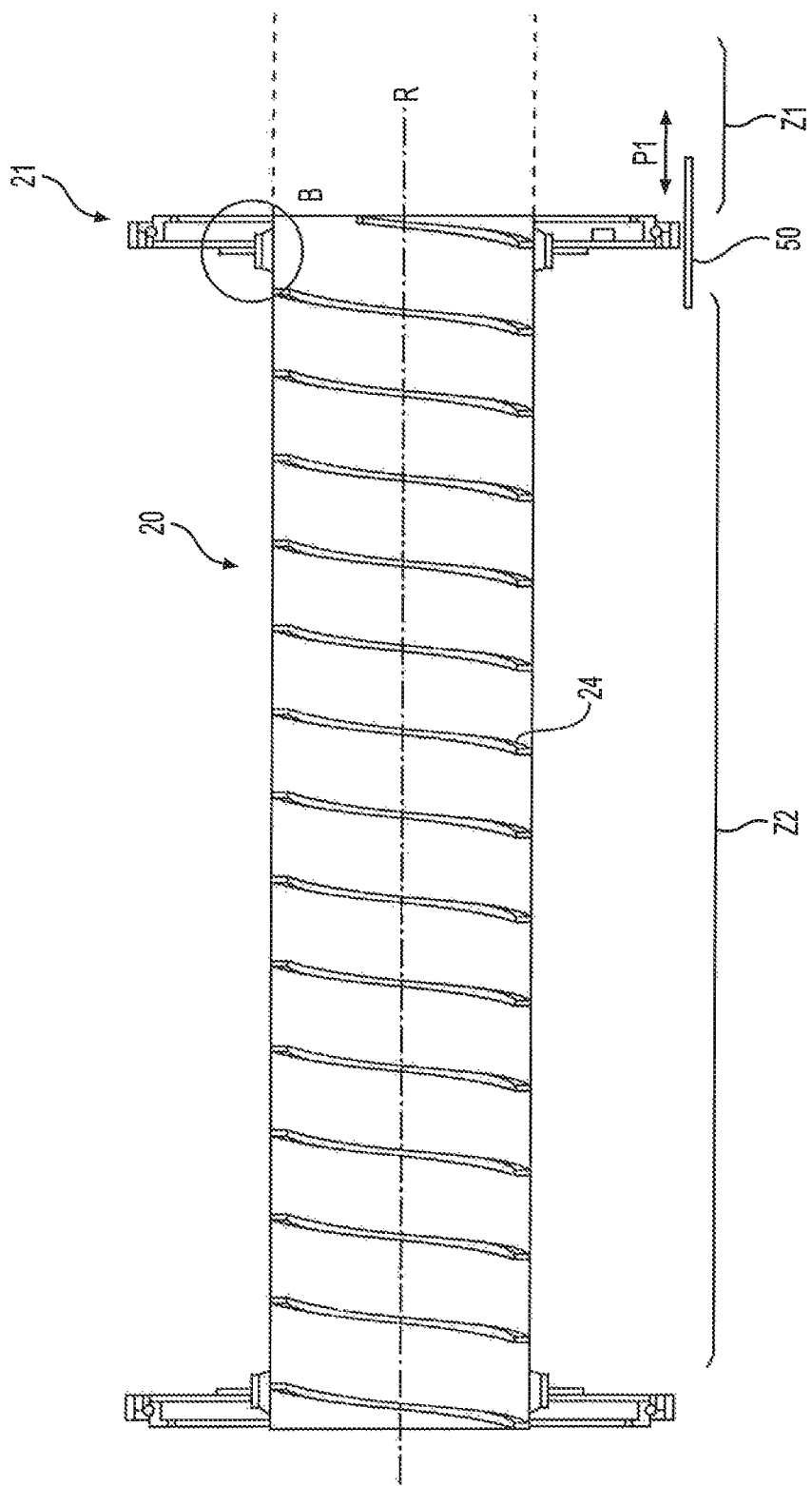
FIG. 4A shows a schematic side view of a longitudinal section of a furnace of a preferred form of embodiment of a device according to the invention.
Figure 4B:
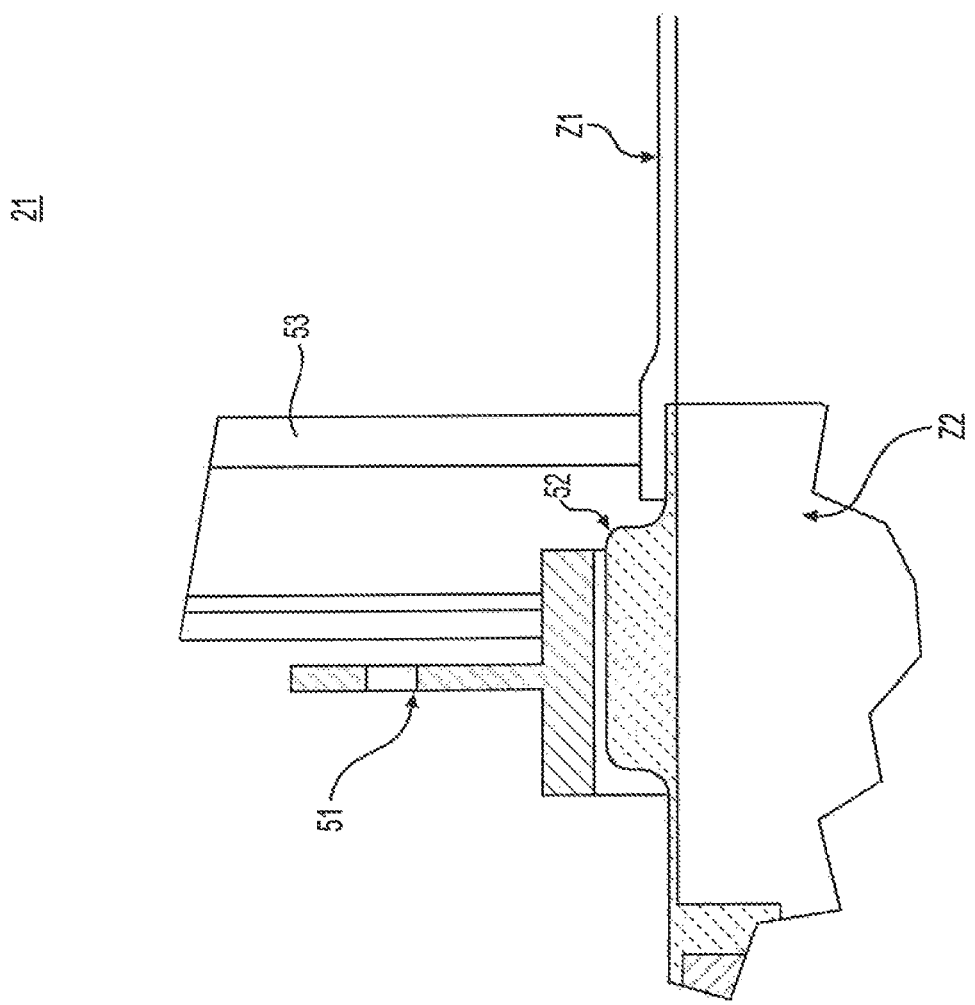
FIG. 4B shows a schematic enlargement of area B in FIG. 4A.

Preferably, in all forms of embodiment the compensator 21 is designed as shown in FIGS. 4A and 4B.

This compensator 21 in FIGS. 4A and 4B is connected to the tubular furnace 20 and is set up/borne in sliding manner in relation to a stationary bearing 50 (FIG. 4A). In the event of thermally-induced expansion the compensator 21 is displaced relative to the bearing 50 as shown by the double arrow P1 in FIG. 4A.

In all forms of embodiment the compensator 21 schematically shown in FIG. 4B preferably comprises a steel holder or a steel ring 51 which is mounted or shrunk onto the tubular furnace. The steel holder or the steel ring 51 preferably encompasses the tubular furnace 20 around 360 degrees.

In the transition area between zones Z1 and Z2 the compensator 21 and/or the tubular furnace 20 comprise(s) a ceramic attachment or ring 52 which in all forms of embodiment preferably encompasses the tubular furnace 20 around 360 degrees.

In the transition area between zones Z1 and Z2 the compensator 21 and/or the tubular furnace 21 preferably comprise(s) a rotating assembly 53 which is directly or indirectly innerly connected to the tubular furnace 20, wherein with its outer circumference the rotating assembly 53 is supporting the tubular furnace 20 in sliding manner parallel to the axis of rotation R with respect to the bearing 50.

Preferably in all forms of embodiment the tubular furnace 20 is supported in a sliding manner in the region of the entry zone E and/or the exit side A in order to permit thermally-induced longitudinal expansion of the tubular furnace 20 in a direction parallel to the axis of rotation R.

Preferably in all forms of embodiment in the region of the exit side A the tubular furnace 20 is borne in such a way that in the region of the exit side A in the event of longitudinal expansion the tubular furnace 20 penetrates a distance into the gas-conducting system 40 in a direction parallel to the axis of rotation R.

Preferably in all forms of embodiment a gas washer 42 is used in the area of the gas-conducting system 40 which is designed for separating pollution and/or nitric oxides and/or heavy metals from the gas mixture.

Particularly suitable are gas washers 42 designed for syngas cleaning. Such gas washers are familiar.

For example, the Acid Gas Removal (AGR) process by the company Air Liquide of Houston, Tex. can be used. This process involves acid gas washing. However, the Rectisol® process available from Lurgi Aktiengesellschaft Corporation of Memphis, Tenn., which utilizes cooled methanol as a solvent can also be used for physical absorption.

Preferably as shown schematically in FIG. 1 in all forms of embodiment, in the region of the gas-conducting system 40 a device 43 for separating hydrogen is used, on the exit side of which hydrogen gas 4 with a hydrogen concentration of more than 70% (preferably more than 80%) and a residual gas 5 are discharged.

The device 43 can, for example, comprise (selective gas separation) membranes for separating hydrogen. Devices 43 for hydrogen separation are known.

FIG. 1 shows a first example device 100 according to the invention. The device 100 comprises, seen from left to right, the following components and elements:

An optional funnel 7 designed for supplying the starting material/material being used 1.

A conveyor element 33 (e.g. with an internal worm or conveyor belt) for conveying the starting material/material being used 1 into the interior space of the furnace 20.

A water (or steam) feed 31, which is here arranged in the region of the conveyor element 33 and which comprises an actuator 32 for regulating the water quantity.

A bearing element/bearing/rotating assembly 35 for supporting the rotary furnace 20 in a rotating manner.

An entry zone E for feeding in the starting material/material to be used 1.

The rotary furnace 20 comprises a first zone Z1 and a second zone Z2 which are spatially separated from one another by a compensator 21.

Figure 2:
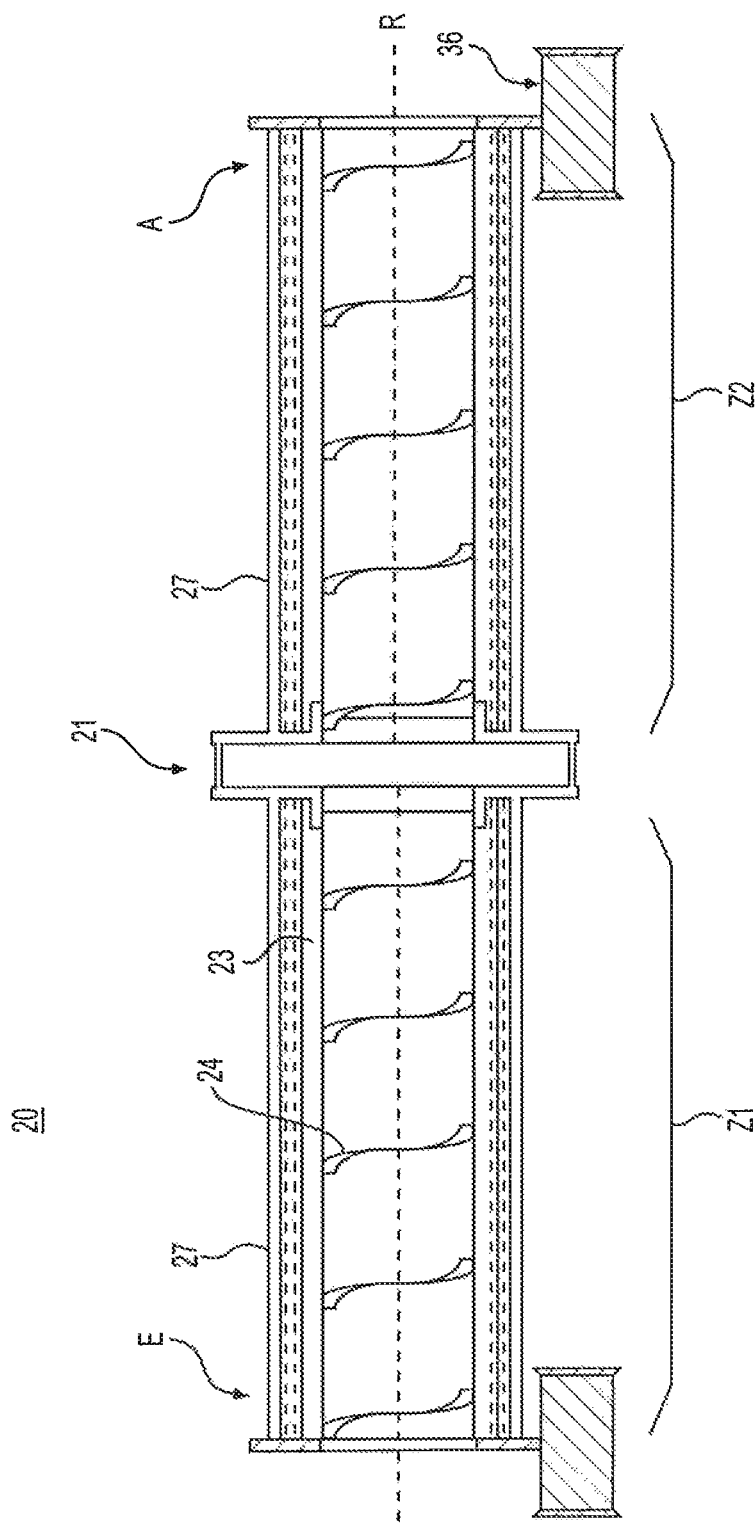
FIG. 2 shows a schematic side view of a furnace of a preferred form of embodiment of a device according to the invention.

A heating system 27 (not shown in FIG. 1) which as shown in FIG. 2 is preferably arranged in or on the wall 23 of the furnace 20.

An exit side A designed for discharging a solid material 2 (as clean inorganic material) and a gas mixture 3.

In the region of the exit side A there can be, for example, a separator 44 for separating the solid material 2 from the gas mixture 3.

In the region of the exit side A there is a gas-conducting system 40 designed for conducting the gas mixture 3 onward.

In the region of the gas-conducting system 40 a gas washer 42 can be arranged.

In the region of the gas-conducing system 40 a gas monitor 41 is arranged in order to be able to determine the currently present quantity of hydrogen (the hydrogen content).

The gas monitor 41 is directly or indirectly connected to the actuator 32 (e.g. via a signal line that is schematically represented in FIG. 1 by the dashed line with arrow heads at its opposite ends).

A device 43 for separating hydrogen can be arranged in the region of the gas-conducting system 40. Seen in the direction of flow, this device 43 is located downstream of the gas monitor 41.

FIG. 2 shows a further example of a furnace 20 which can form part of a device 100 according to the invention. The furnace 20 comprises, seen from left to right, the following components and elements:

An entry zone E for feeding in the starting material/material to be used 1.

A first zone Z1 and a second zone Z2 which are spatially separated from one another by a compensator 21.

A heating system 27 which here is arranged in or on the wall 23 of the furnace 20. In the region of the second zone Z2 the heating system 27 can have a higher heat output than in the region of the first zone Z1. As the processes taking place in the interior space are at least partially exothermic, the heating output generated by the heating system 27 in the region of the second zone Z2 does not have to be higher in all forms of embodiment.

Internal conveying vanes 24 in the furnace 20.

An exit side A designed for discharging a solid material 2 (as a clean organic material) and a gas mixture 3.

Conveying rollers 36 and/or rotating assembly for rotationally driving the furnace 20.

Figure 3:
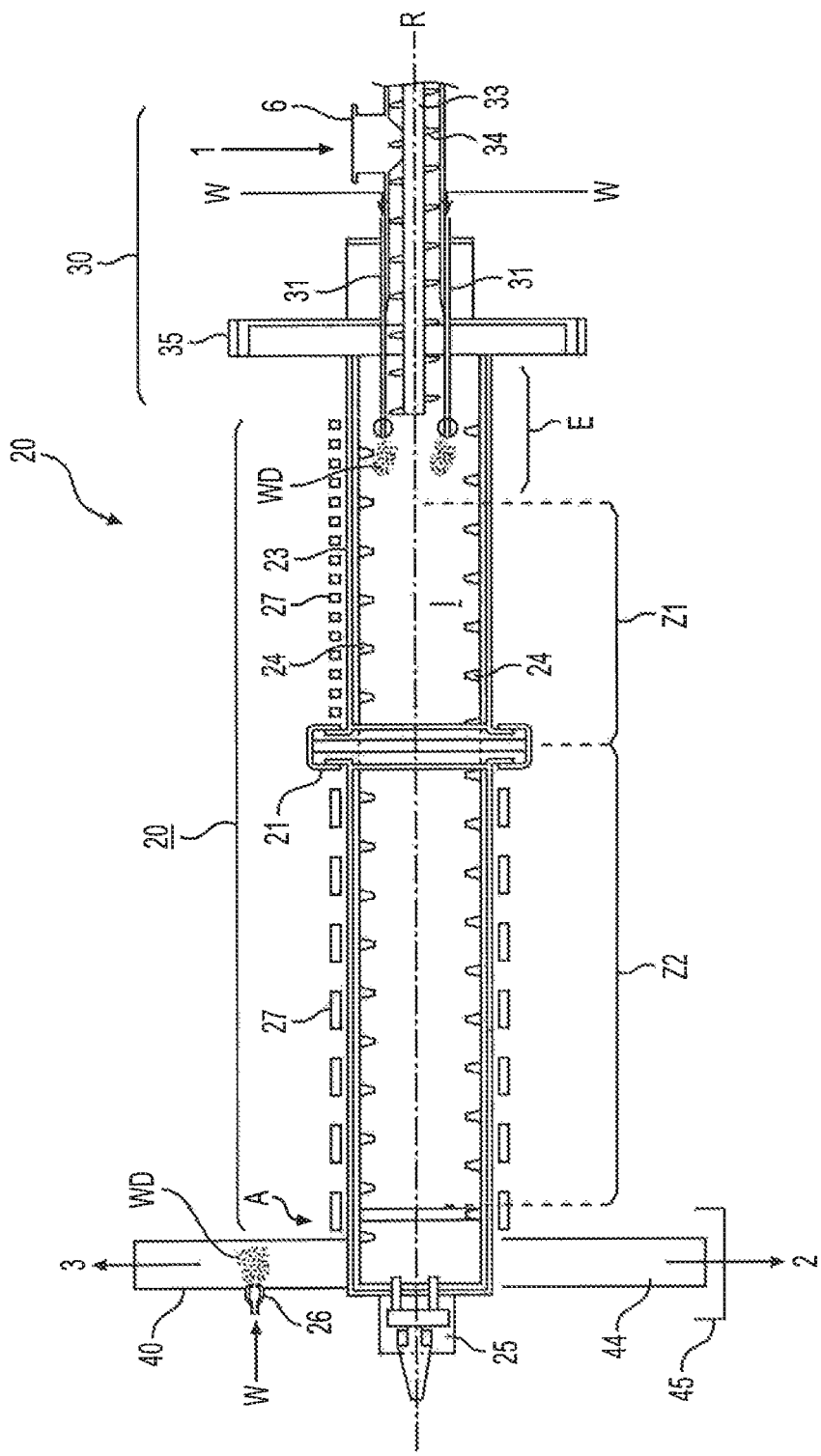
FIG. 3 shows a schematic side view of a furnace and feed device of a preferred form of embodiment of a device according to the invention.

FIG. 3 shows a further example furnace 20 that can be part of a device 100 according to the invention. The furnace comprises, seen from right to left, the following components and devices:

A conveying element 33 (e.g. with an internal worm or a conveyor belt) that forms part of a feed device 30 and feeds the starting material/material being used 1 into the interior space of the furnace 20. Here the starting material/material being used 1 can, for example, reach the conveying element from above through a material feeder 6.

A bearing element/bearing 35 for supporting the tubular furnace 20 in a rotating manner.

An entry zone E for feeding in the starting material/material being used 1.

A water (or steam) feed 31 which here is arranged in the region of the conveyor element 33 and which feeds a quantity of water W (as steam WD) directly into the interior space I of the furnace 20.

The tubular furnace 20 comprises a first zone Z1 and a second zone Z2 which are spatially separated from one another by a compensator 21.

A heating system 27 which here is arranged in or on the wall 23 of the furnace 20. In the region of the second zone Z2 the heating system 27 can have a higher heat output than in the region of the first zone Z1. As the processes taking place in the interior space I are at least partially exothermic, the heating output of the heating system 27 in the region of the second zone Z2 does not have to be higher in all forms of embodiment.

An exit side A designed for discharging a solid material 2 (as a clean organic material) and a gas mixture 3.

A gas-conducting system 40 for removing the gas mixture 3.

In the region of the exit side A or on the gas-conducting system 40 a water (or steam) feed 26 (e.g. a water jet) can optionally be arranged.

Arranged in the region of the exit side A can be, for example, a separator 44 for separating the solid material 2 can be provided along with a collection container 45 that receives discharge of the solid material from the separator 44.

REFERENCE LIST

| Starting material/material being use | 1 |
|---|---|
| Solid material/clean organic material | 2 |
| Gas mixture | 3 |
| Hydrogen gas | 4 |
| Residual gas | 5 |
| Material feed | 6 |
| Funnel | 7 |
| Rotary furnace | 20 |
| Compensator | 21 |
| Tube wall | 23 |
| Conveying vanes | 24 |
| (Counter) bearing | 25 |
| Water (or steam) feed | 26 |
| Preheating system | 27.1 |
| Main heating system | 27.2 |
| Feed device | 30 |
| Water (or steam) feed | 31 |
| Actuator | 32 |
| Conveying element/worm | 33 |
| Pipe | 34 |
| Bearing element/bearing/rotating assembly | 35 |
| Conveying, rollers | 36 |
| Gas-conducting system | 40 |
| Gas monitor | 41 |
| Gas washer | 42 |
| Hydrogen separating device | 43 |
| Separator | 44 |
| Collection container | 45 |
| Bearing | 50 |
| Steel holder or steel ring | 51 |
| Ceramic attachment or ring | 52 |
| Rotating assembly | 53 |
| Device | 100 |
| Exit side | A |
| Entry zone | E |
| Interior space | I |
| Double arrow | P1 |
| Axis of rotation | R |
| Control variable | S1 |
| Water content (water or steam) | W |
| Steam | WD |
| First zone | Z1 |
| Second zone | Z2 |

The invention claimed is:

1. A method of recovering a hydrogen-enriched gas from starting materials containing carbon or hydrocarbons, the method comprising the following steps:

introducing starting material into a feed device to a rotary furnace, wherein the rotary furnace is rotatably supported on a stationary bearing and defines an interior space that is tubular about an axis of rotation and defines an entry zone at one end of the tubular interior space and further defines an exit side disposed downstream along the axis of rotation from the entry zone, wherein the starting materials contains carbon or hydrocarbons, and conducting the starting material from the feed device into the entry zone of the tubular space of the rotary furnace;

adding a mass of water to the starting materials before the starting materials are conducted away from the entry zone;

thermally expanding the starting materials and water in the interior space of the rotary furnace, wherein in a first zone of the tubular interior space of the rotary furnace a preheating system is used to bring the starting materials in the first zone up to a preheating temperature of between 300 degrees Celsius and 900 degrees Celsius and wherein in a second zone of the tubular furnace downstream of the first zone a main heating system is used to bring the starting materials in the second zone up to a high temperature of over 1000 degrees Celsius;

wherein the rotary furnace comprises a compensator that is disposed between the first zone and the second zone, wherein the compensator is connected directly or indirectly to the outside of the rotary furnace and is disposed between the rotary furnace and the stationary bearing in a sliding manner;

extending the rotary furnace along the axis of rotation and in a sliding manner with respect to the stationary bearing to compensate for the thermally induced expansion of the rotary furnace;

discharging a gas mixture from the exit side of the rotary furnace into a gas-conducting system disposed downstream of the exit side of the rotary furnace;

using a gas monitor disposed in the gas-conducting system to monitor the content of hydrogen in the gas mixture;

regulating the mass of water being added to the starting materials according to the content of hydrogen in the gas mixture in the gas-conducting system downstream of the exit side of the rotary furnace; and collecting from the gas-conducting system downstream from the gas monitor a gas mixture containing at least 70 percent by volume hydrogen.

2. The method according to claim 1, wherein the mass of water feed is added to the starting material before the starting material is conducted into the entry zone of the tubular furnace.

3. The method according to claim 1, wherein a conveying worm arranged in the interior space of the tubular furnace is used to convey the starting material and mass of water through the tubular furnace from the entry zone to the exit side as the tubular furnace is turned about its axis of rotation.

4. The method according to claim 1, wherein a plurality of conveying vanes arranged in the interior space of the tubular furnace is used to convey the starting material and mass of water through the tubular furnace from the entry zone to the exit side as the tubular furnace is turned about its axis of rotation.

5. The method according to claim 1, wherein a gas manometer acts as the gas monitor.

6. The method according to claim 1, further comprising the step of using in the gas-conducting system a gas washer to separate pollutants and/or nitric oxides and/or heavy metals from the gas mixture.

7. The method according to claim 1, further comprising the step of using in the gas-conducting system a gas separating device disposed downstream from the gas monitor in the direction of flow, wherein the gas separating device is used for separating hydrogen gas from a residual gas in the gas mixture that is dispensed from the exit side of the rotary furnace.

8. The method according to claim 7, further comprising the step of controlling the mass of water added so as to collect from the gas-conducting system a gas mixture with a hydrogen concentration of more than 80% and the residual gas.

9. The method according to claim 1, further comprising the steps of:
- separating solids from the starting material and water while rotating the rotary furnace during thermal expansion of the starting material and water; and
- discharging the separated solids at the exit side of the rotary furnace.

\* \* \* \* \*